D. WILLIS AND E. H. MARTENS.
TRACTION AND ANTISKID DEVICE FOR TRUCK TIRES.
APPLICATION FILED APR. 13, 1918.
1,306,730. Patented June 17, 1919.
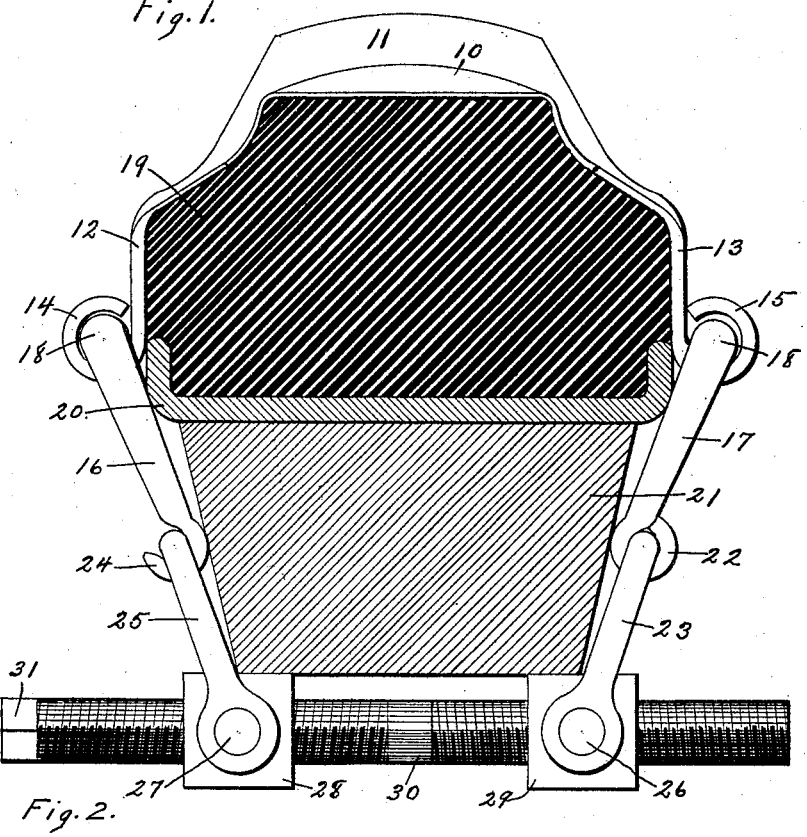
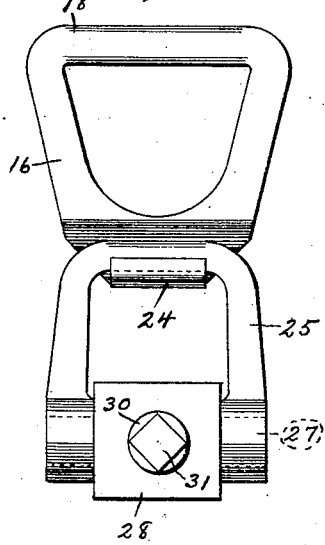
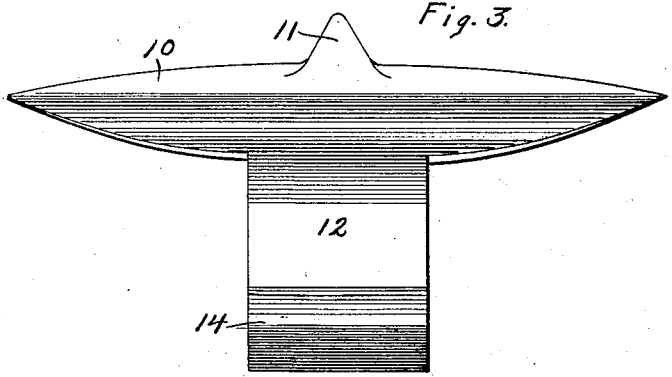
INVENTORS:
DICK WILLIS AND
E. H. MARTENS

UNITED STATES PATENT OFFICE.

DICK WILLIS AND EDWARD H. MARTENS, OF WESTSIDE, IOWA.

TRACTION AND ANTISKID DEVICE FOR TRUCK-TIRES.

1,306,730.    Specification of Letters Patent.    Patented June 17, 1919.

Application filed April 13, 1918. Serial No. 228,308.

*To all whom it may concern:*

Be it known that we, DICK WILLIS and EDWARD H. MARTENS, citizens of the United States of America, and residents of Westside, Crawford county, Iowa, have invented a new and useful Traction and Antiskid Device for Truck-Tires, of which the following is a specification.

The object of this invention is to provide an improved construction for a removable and replaceable device adapted to be mounted singly or in multiple on a truck tire and when so mounted increase the traction and prevent skidding of said tire, particularly on a muddy roadway.

A further object of this invention is to provide improved means for locking a traction and anti-skid device on a truck tire.

A further object of this invention is to provide improved means for expanding and contracting a retaining mechanism for a traction and anti-skid device relative to a truck tire.

A further object of this invention is to provide an improved quick-detachable device for a truck tire adapted to increase traction and prevent skidding of said tire.

A further object of this invention is to provide an improved construction for a mud lug.

Our invention consists in the construction, arrangement and combination of elements hereinafter set forth, pointed out in our claims and illustrated by the accompanying drawing, in which—

Figure 1 is a cross-section of a tire, rim and felly with an antiskid device, shown in elevation, applied thereto. Fig. 2 is an elevation at right angles to Fig. 1 showing the attaching devices removed, and Fig. 3 is an elevation at right angles to Fig. 1 showing the mud lug alone.

This application is a continuation in part of our joint application filed February 9, 1918, Serial Number 216,188, to which reference hereby is made.

In the construction of the device as shown a mud lug is provided, which mud lug is formed with a central substantially oval plate 10 which is concaved in one direction, following the circumference of a tire on which it is to be used. The plate 10 also is preferably of greater thickness in its center than at its forward and rear margins (in respect of the circumference of a wheel on which it is used) and is formed with a centrally located integral rib 11 which projects from the central portion of the plate and is so arranged that it may extend transversely of the tire on which the device is used and provide traction means. The plate 10 is formed with extensions or wings 12, 13 in line with the ends of the rib 11 and the extremities of said extensions are recurved to form substantially closed hooks or eyes 14, 15. The rib 11 preferably is curved on an arc at its outer margin and its ends merge into the plate, as shown in Fig. 1.

Links 16, 17 are formed with straight end bars 18 contained or pivoted within the hooks or eyes 14, 15. The extensions 12, 13 are bent relative to the plate 10 and stand substantially radially of a tire on which the device is used and on opposite sides of the tire, such as 19 when said tire is mounted on a rim 20 carried by a felly 21 of a tractor or truck wheel, and suspend the links 16, 17 on opposite sides of said tire, rim and felly. The tire, rim and felly are shown conventionally and form no part of our invention. By forming the links 16, 17 with straight end bars 18 pivoted in the extensions of the mud lug, said links tend to hold (when strain is applied thereto) the mud lug in stable equilibrium on the tire and prevent slipping thereof circumferentially of the tire. The link 17 is formed with a substantially closed eye 22 on its extremity and a clevis 23 is pivoted in said eye. The link 16 is formed with an outwardly opening hook 24 at its extremity, and a clevis 25 is adapted to be secured at times in said hook. The pins 26, 27 of the clevises 23, 25 respectively are formed with central bosses or blocks 28, 29 having alined threaded apertures between the arms of the clevises. A bolt 30 is provided and has oppositely arranged threaded portions on opposite sides of its center, and said threaded portions are threaded into the bosses or blocks 28, 29. The bolt 30 has an angular end portion 31 adapted to be engaged by a wrench or other tool to rotate the bolt in the blocks 28, 29, and such rotation causes a separation or approach of said blocks relative to one another dependent upon the direction of rotation of the bolt. The bolt 30 is adapted to extend across and adjacent the inner surface of a felly 21 when a felly is employed.

In practical use the device is applied as shown in Fig. 1, the bolt 30 being turned in the proper direction to cause the traveling blocks 28, 29 to approach each other, after the clevis 25 has been caused to engage the hook 24. This movement is continued until the connecting devices, links 16, 17 and clevises 23, 25, are drawn sufficiently tight that removal of the clevis from the hook 24 is prevented and until sufficient strain is applied to the mud lug to hold it in place on the tire 19. When it is desired to remove the device the bolt 30 is turned in the opposite direction, thus causing a separation of the traveling blocks 28, 29 of the clevises, until sufficient slack is secured to permit release of the clevis 25 from the hook 24, after which the entire device may be lifted away from the tire and be retained in connected relations until again desired for use, none of the parts being entirely separated from the assembly so as to be in danger of being lost.

Through the use of the bolt 30 and devices carried thereby to effect an expansible and contractible connection between the clevises 23, 25, a considerable range of expansion and contraction of the device is obtained thus facilitating attaching and detaching of the device when desired.

It is to be understood that any number of these devices may be mounted on and throughout the circumference of a wheel to effect the desired continuity of application of traction and anti-skidding features.

The curving of the outer margin of the rib 11 of the mud lug insures contact with the tread surface when the wheel is tipped, as in rounding a corner.

We claim as our invention—

1. A traction and anti-skid device for truck tires, comprising a mud lug having eyes on opposite sides thereof, links pivoted in said eyes, clevises pivoted to said links, a bolt having oppositely arranged threaded portions at its opposite end portions, traveling blocks threaded on the respective threaded portions of said bolt, and pivotal connections between each of said clevises and one of said blocks.

2. A traction and anti-skid device for truck tires, comprising a mud lug having eyes on opposite sides thereof, links pivoted in said eyes, clevises pivoted to said links, the connection of one of said clevises to its link being detachable, a bolt having oppositely arranged threaded portions, traveling blocks threaded on the respective threaded portions of said bolt, and pivotal connections between each of said clevises and one of said blocks.

3. A connecting device for an anti-skid and traction device, comprising a bolt adapted to extend transversely of the inner surface of a wheel rim or felly, said bolt having two threaded portions oppositely arranged, a traveling block threaded on each of said threaded portions, a clevis pivoted to each of said traveling blocks and pivotal connections between said clevises and opposite ends of said device.

4. A connecting device for anti-skid and traction device, comprising a bolt adapted to extend transversely of the inner surface of a wheel rim or felly, said bolt having two threaded portions oppositely arranged, a traveling block threaded on each of said threaded portions, a clevis pivoted to each of said traveling blocks, and pivotal connections between said clevises and opposite ends of said device, the connection of one of said clevises being detachable.

5. A traction and anti-skid device for truck tires, comprising a mud lug having eyes on opposite sides thereof, links pivoted in said eyes, a bolt transversely arranged, a clevis pivoted in one of said links and having pivotal connections with one end portion of said bolt, the opposite end portion of the bolt being threaded, a traveling block threaded on said bolt, and a clevis pivoted to said traveling block and adapted detachably to engage the other of said links.

6. A traction and anti-skid device for truck tires, comprising a mud lug having eyes on opposite sides thereof, links pivoted in said eyes, a bolt transversely arranged, a third link pivoted in one of the first-named links, there being a swivel connection between said bolt and said third link, the opposite end portion of said bolt being threaded, a boss adjustably mounted on the threaded portion of said bolt, and a clevis pivoted in the other of the first named links and also pivoted to said boss.

7. A traction and anti-skid device for truck tires, comprising a mud lug having eyes on opposite sides thereof, links pivoted in said eyes, a bolt transversely arranged, a third link pivoted in one of the first-named links, the opposite end portion of said bolt being threaded, a boss threaded on the threaded portion of said bolt, and a clevis pivoted in the other of the first-named links and also pivoted to said boss, the pivot of said clevis to said boss being substantially at right angles to the axis of said bolt.

8. A traction and anti-skid device for truck tires, comprising a mud lug having eyes on opposite sides thereof, links pivoted in said eyes, a bolt transversely arranged, a third link pivoted in one of the first-named links, there being a swivel connection between said bolt and said third link, the opposite end portion of said bolt being threaded, a boss adjustably mounted on the threaded portion of said bolt, one portion of said bolt being angular in cross-section whereby said bolt may be turned to cause said boss to travel in either direction thereon, and a clevis pivoted in the other of the first named links and also pivoted to said boss whereby said boss is held against rotation on said bolt.

DICK WILLIS.
EDWARD H. MARTENS.

Copies of this patent may be obtained for five cents each, by addressing the "Commissioner of Patents, Washington, D. C."